US011866995B2

(12) United States Patent
Parker

(10) Patent No.: US 11,866,995 B2
(45) Date of Patent: Jan. 9, 2024

(54) LADDER WITH BOX RAILS HAVING A COLLAR

(71) Applicant: Werner Co., Greenville, PA (US)

(72) Inventor: Thomas W. Parker, Jamestown, PA (US)

(73) Assignee: Werner Co., Greenville, PA (US)

(*) Notice: Subject to any disclaimer, the term of this patent is extended or adjusted under 35 U.S.C. 154(b) by 66 days.

(21) Appl. No.: 16/795,171

(22) Filed: Feb. 19, 2020

(65) Prior Publication Data

US 2021/0198945 A1 Jul. 1, 2021

Related U.S. Application Data

(60) Provisional application No. 62/954,276, filed on Dec. 27, 2019, provisional application No. 62/954,290, filed on Dec. 27, 2019.

(51) Int. Cl.
*E06C 7/08* (2006.01)
*E06C 1/12* (2006.01)
*E06C 7/50* (2006.01)

(52) U.S. Cl.
CPC ................ *E06C 7/085* (2013.01); *E06C 1/12* (2013.01); *E06C 7/08* (2013.01); *E06C 7/086* (2013.01); *E06C 7/50* (2013.01)

(58) Field of Classification Search
CPC .......... E06C 7/085; E06C 7/086; E06C 7/087; E06C 7/082; E06C 7/08; E06C 7/50; E06C 1/12
See application file for complete search history.

(56) References Cited

U.S. PATENT DOCUMENTS

| | | | |
|---|---|---|---|
| 1,025,493 | A | 5/1912 | Vogel |
| 1,191,729 | A | 7/1916 | Pool |
| 1,835,243 | A | 12/1931 | Schaffert |
| 2,327,585 | A | 8/1943 | Ulrich |
| 2,509,192 | A | 5/1950 | Jules |
| 2,545,752 | A | 3/1951 | Singleton |
| 2,560,961 | A | 7/1951 | Karl |
| 2,562,336 | A | 7/1951 | Selden |
| 2,713,284 | A | 7/1955 | Bedford, Jr. |
| 2,760,706 | A | 8/1956 | Pearl |
| 2,767,877 | A | 10/1956 | Newsom |
| 2,957,543 | A | 10/1960 | Clayton |

(Continued)

FOREIGN PATENT DOCUMENTS

| | | |
|---|---|---|
| GB | 1198512 | 7/1970 |

*Primary Examiner* — Daniel P Cahn
*Assistant Examiner* — Shiref M Mekhaeil
(74) *Attorney, Agent, or Firm* — Fitch, Even, Tabin & Flannery LLP

(57) ABSTRACT

A ladder having a right box rail having an outer web with an outer opening and an inner web with an inner opening. The ladder having a left box rail in parallel and spaced relation with the right box rail. The ladder comprises a hollow collar disposed in between the inner opening of the inner web and the outer opening of the outer web. The collar having a stem having a plurality of segments. The segments separated by slots. The ladder having a first rung attached to the right and left box rails. The first rung having a right end that extends through the outer opening, the collar and the inner opening. A method for using a ladder by a user. A method for forming a ladder.

11 Claims, 10 Drawing Sheets

(56) References Cited

U.S. PATENT DOCUMENTS

| | | | | | |
|---|---|---|---|---|---|
| 2,989,141 | A * | 6/1961 | Howard | E06C 7/086 | 182/216 |
| 3,002,582 | A * | 10/1961 | Marcelis | E06C 7/085 | 29/523 |
| 3,004,625 | A * | 10/1961 | Arnold | E06C 1/12 | 29/512 |
| 3,030,850 | A | 4/1962 | Minor | | |
| 3,076,668 | A | 2/1963 | Max | | |
| 3,078,002 | A | 2/1963 | Rodgers, Jr. | | |
| 3,092,162 | A | 6/1963 | Johnsen | | |
| 3,099,057 | A | 7/1963 | Cook | | |
| 3,103,547 | A | 9/1963 | Ansley | | |
| 3,168,938 | A * | 2/1965 | Shaver | E06C 7/085 | 29/523 |
| 3,181,651 | A * | 5/1965 | Larson | E06C 7/084 | 29/524.1 |
| 3,208,554 | A * | 9/1965 | Arnold | E06C 7/088 | 182/216 |
| 3,232,378 | A * | 2/1966 | Larson | E06C 7/085 | 29/513 |
| 3,270,410 | A | 9/1966 | Salter | | |
| 3,279,835 | A * | 10/1966 | Freda | F16B 21/186 | D8/382 |
| 3,283,402 | A * | 11/1966 | Larson | E06C 7/085 | 29/523 |
| 3,318,413 | A * | 5/1967 | Werner | E06C 7/085 | 29/520 |
| 3,327,385 | A * | 6/1967 | Shaver | E06C 7/085 | 29/523 |
| 3,343,630 | A | 9/1967 | Redman | | |
| 3,349,870 | A * | 10/1967 | Lieblein | E06C 7/085 | 29/523 |
| 3,354,987 | A * | 11/1967 | Werner | E06C 7/085 | 29/523 |
| 3,402,788 | A | 9/1968 | Redman | | |
| 3,426,867 | A * | 2/1969 | Berger | E06C 7/085 | 182/228.1 |
| 3,452,149 | A | 6/1969 | Rinaldi | | |
| 3,454,135 | A | 7/1969 | Redman | | |
| 3,462,114 | A | 8/1969 | O'Dell, Sr. | | |
| 3,481,026 | A * | 12/1969 | Lindesmith | B21D 39/063 | 29/523 |
| 3,484,931 | A * | 12/1969 | Lindesmith | E06C 7/085 | 29/523 |
| 3,491,853 | A | 1/1970 | Stillman, Jr. | | |
| 3,528,525 | A * | 9/1970 | Lindesmith | E06C 7/085 | 182/228.4 |
| 3,545,072 | A * | 12/1970 | Lindesmith | B21D 39/063 | 29/520 |
| 3,766,631 | A * | 10/1973 | Scheitlin | F16B 17/006 | 29/523 |
| 3,836,704 | A | 9/1974 | Coules | | |
| 3,837,208 | A | 9/1974 | Gray | | |
| 3,844,588 | A * | 10/1974 | Jocsak | F28F 9/0131 | 403/197 |
| 3,880,257 | A * | 4/1975 | Gubri | E06C 7/085 | 182/228.6 |
| 3,893,776 | A * | 7/1975 | Beattie | F16B 9/054 | 403/259 |
| 3,935,926 | A | 2/1976 | Butler | | |
| 4,010,519 | A | 3/1977 | Worthing | | |
| 4,033,243 | A | 7/1977 | Kirrish | | |
| 4,140,040 | A | 2/1979 | Modrey | | |
| 4,177,879 | A * | 12/1979 | Frank | E06C 7/087 | 182/220 |
| 4,205,426 | A * | 6/1980 | Stillman, Jr. | E06C 7/085 | 29/523 |
| 4,219,102 | A * | 8/1980 | Ducresot | E06C 7/085 | 182/220 |
| 4,244,661 | A | 1/1981 | Dervy | | |
| 4,261,436 | A * | 4/1981 | Stillman, Jr. | E06C 7/085 | 182/194 |
| 4,363,580 | A | 12/1982 | Bell | | |
| 4,449,878 | A | 5/1984 | Hallock | | |
| 4,557,100 | A | 12/1985 | Gorges | | |
| 4,597,687 | A * | 7/1986 | Colas | B21D 39/044 | 29/523 |
| 4,656,721 | A * | 4/1987 | Werner | B21D 39/063 | 29/523 |
| 4,698,896 | A * | 10/1987 | Osterwald | E06C 7/085 | 29/523 |
| 4,761,105 | A | 8/1988 | Gardner | | |
| 4,766,664 | A * | 8/1988 | Benedyk | E06C 7/087 | 29/523 |
| 4,773,804 | A | 9/1988 | Ausprung | | |
| 4,802,643 | A | 2/1989 | Uys | | |
| 4,807,351 | A * | 2/1989 | Berg | B21D 26/14 | 403/283 |
| 4,934,861 | A | 6/1990 | Weeks | | |
| 4,967,879 | A * | 11/1990 | Klafs | F16B 7/048 | 182/228.4 |
| 5,040,917 | A | 8/1991 | Camuffo | | |
| 5,244,326 | A | 9/1993 | Henriksen | | |
| 5,304,012 | A * | 4/1994 | Wendling | B21K 25/00 | 403/359.6 |
| 5,317,798 | A * | 6/1994 | Thompson | E06C 7/081 | 29/453 |
| 5,528,812 | A | 6/1996 | Mueller | | |
| 5,682,678 | A | 11/1997 | Gallagher | | |
| 5,685,663 | A | 11/1997 | Sadri | | |
| 5,758,745 | A | 6/1998 | Beggs | | |
| 6,012,763 | A | 1/2000 | Clemente | | |
| 6,113,327 | A * | 9/2000 | Schrader | B60P 7/0823 | 410/97 |
| 6,269,909 | B1 | 8/2001 | Grimes | | |
| 6,290,213 | B1 * | 9/2001 | Laird | E04F 11/181 | 256/65.05 |
| 6,419,046 | B1 * | 7/2002 | Cubbison | E04G 5/002 | 182/119 |
| 6,511,274 | B1 | 1/2003 | Nagayama | | |
| 7,086,499 | B2 | 8/2006 | Moss | | |
| 7,201,398 | B1 | 4/2007 | Christofaro | | |
| 7,300,536 | B1 | 11/2007 | Wang | | |
| 8,371,783 | B2 | 2/2013 | Diehl | | |
| 8,434,984 | B2 | 5/2013 | Toosky | | |
| 8,484,930 | B2 | 7/2013 | Ruehl | | |
| 8,591,158 | B2 | 11/2013 | Diehl | | |
| 8,668,049 | B2 * | 3/2014 | Leng | E06C 7/086 | 182/228.3 |
| 8,807,281 | B1 * | 8/2014 | Hoffman | E06C 7/143 | 182/129 |
| 10,661,837 | B2 | 5/2020 | Madsen | | |
| 10,753,224 | B2 | 8/2020 | Mena Dominguez | | |
| 10,760,335 | B2 * | 9/2020 | Mora | E06C 7/084 | |
| 11,142,949 | B2 | 10/2021 | Leng | | |
| 11,274,494 | B2 | 3/2022 | Leng | | |
| 2003/0143053 | A1 | 7/2003 | Kanie | | |
| 2004/0175254 | A1 | 9/2004 | Peng | | |
| 2006/0137166 | A1 | 6/2006 | Babej | | |
| 2006/0228194 | A1 | 10/2006 | Nilsen | | |
| 2007/0107368 | A1 | 5/2007 | Ruehl | | |
| 2010/0124471 | A1 | 5/2010 | Diehl | | |
| 2011/0150597 | A1 | 6/2011 | Muramatsu | | |
| 2015/0075908 | A1 * | 3/2015 | Moss | E06C 1/12 | 182/207 |
| 2018/0163468 | A1 * | 6/2018 | Mora | E06C 7/082 | |
| 2021/0079727 | A1 | 3/2021 | Garcia | | |

* cited by examiner

LADDER WITH BOX RAILS HAVING A COLLAR

CROSS-REFERENCE TO RELATED APPLICATIONS

This application claims priority from U.S. provisional application Ser. No. 62/954,276 filed Dec. 27, 2019 and U.S. provisional application Ser. No. 62/954,290 filed Dec. 27, 2019, both of which are incorporated by reference herein. This application also incorporates by reference U.S. patent application Ser. No. 16/795,086, filed concurrently with this application on Feb. 19, 2020; and incorporates by reference U.S. patent application Ser. No. 16/795,132, filed concurrently with this application on Feb. 19, 2020.

FIELD OF THE INVENTION

The present invention is related to a ladder having box rails with rungs attached to the box rails using collars about the rungs in between the inner and outer webs of the rails. (As used herein, references to the "present invention" or "invention" relate to exemplary embodiments and not necessarily to every embodiment encompassed by the appended claims.) More specifically, the present invention is related to a ladder having box rails with rungs attached to the box rails using collars about the rungs in between the inner and outer webs of the rails where the collars snap into the rails.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

When box rails are used for a ladder, the rungs or steps must be securely and safely attached to the box rails. However, because box rails do not have anything in between the opposing webs, the webs are susceptible to damage, such as cracking or denting when perpendicular forces are applied to them to attach the rung to the rail, such as by swaging the end of the rung to the outer web. In order to avoid any damage to the webs during the rung attachment process, typically some type of collar must be positioned inside the rail between the webs to support the opposing webs when the swaging process occurs. To accomplish this, collars have been inserted down the length of the rails having adhesive to hold the collars and the desired position, which is a tedious and time-consuming operation, let alone not always positioning the collars properly in place with the adhesive.

BRIEF SUMMARY OF THE INVENTION

The present invention pertains to a ladder. The ladder comprises a right box rail having an outer web with an outer opening and an inner web with an inner opening. The inner opening in alignment with the outer opening. The inner opening having a diameter which is smaller than a diameter of the outer opening. The ladder comprises a left box rail in parallel and spaced relation with the right box rail. The ladder comprises a hollow collar disposed in between the inner opening of the inner web and the outer opening of the outer web. The collar having a stem having a plurality of segments. The segments separated by slots. Each segment having a top and a bottom. The ladder comprises a first rung attached to the right and left box rails. The first rung having a right end that extends through the outer opening, the collar and the inner opening.

A method for forming a ladder. The method comprises the steps of inserting a hollow collar in between an inner opening of an inner web and an outer opening of an outer web of a right box rail of the ladder. The collar having a stem having a plurality of segments. The segments separated by slots. Each segment having a top and a bottom. The inner opening having a diameter which is smaller than a diameter of the outer opening. There is the step of extending a right end of the first rung through the inner opening, the collar and the outer opening. There is the step of fixedly attaching the right end of the first rung to the outer web. There is the step of fixedly attaching a left end of the first rung to an outer web of a left box rail.

The present invention pertains to a method for using a ladder by a user. The method comprises the steps of moving the ladder to a desired location. There is the step of positioning the ladder for a user to climb the ladder.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
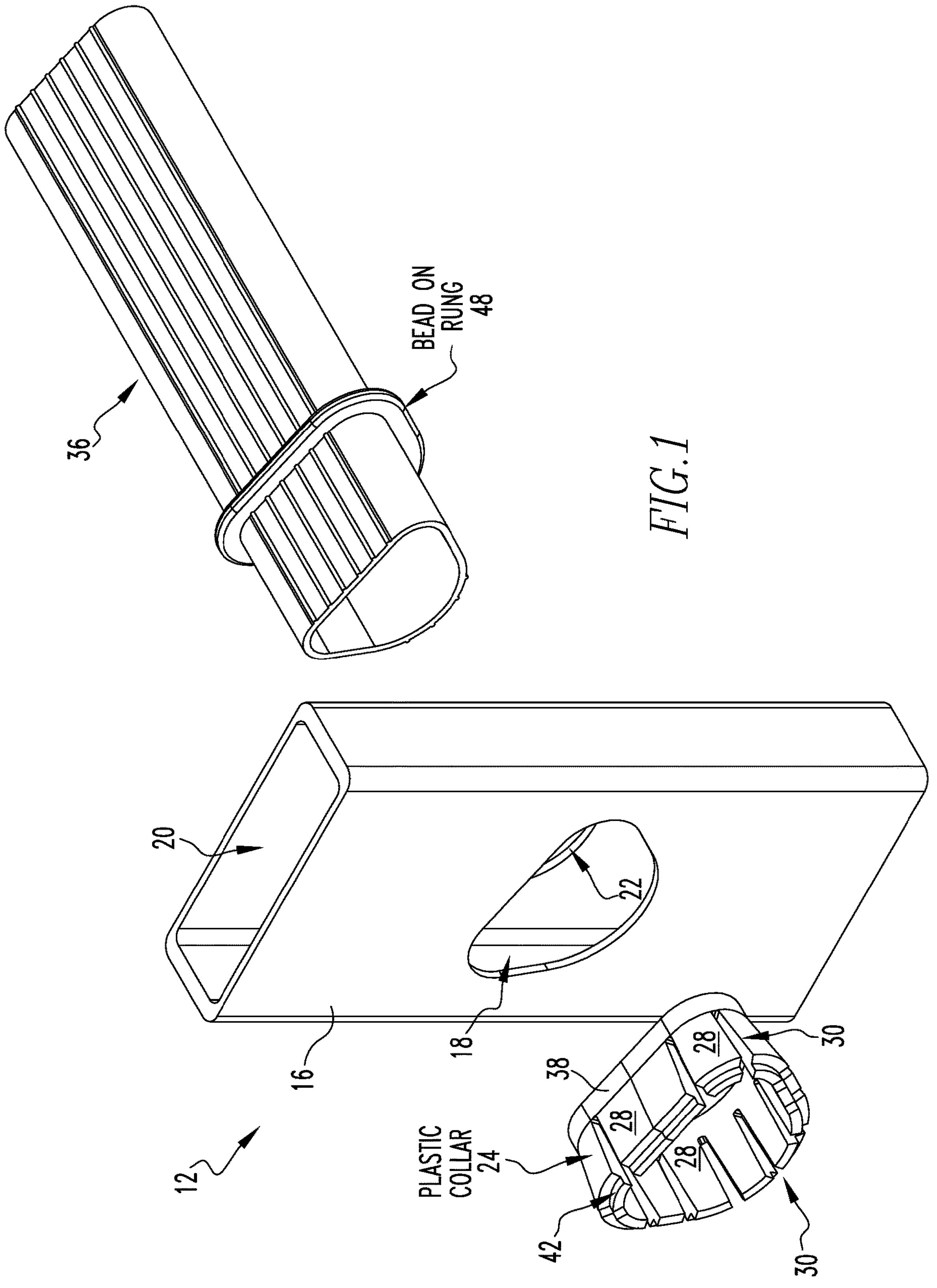
FIG. 1 is an exploded view of a rung, rail and collar.
Figure 10:
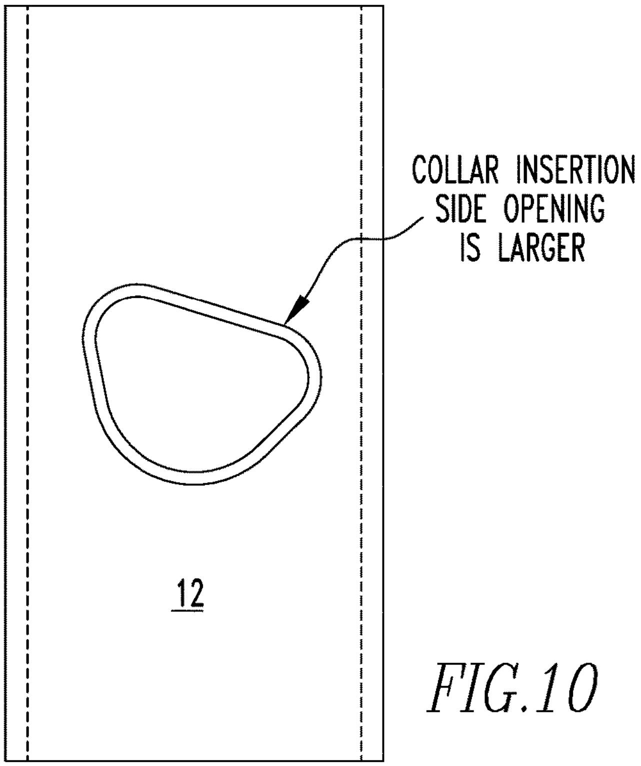
FIG. 10 shows a collar insertion side of a rail.
Figure 11:
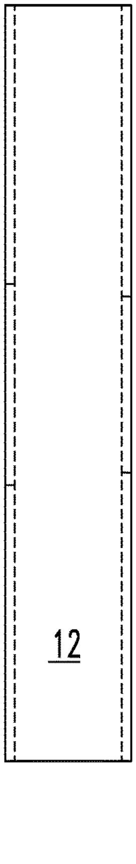
FIG. 11 is a side view of a rail.
Figure 12:
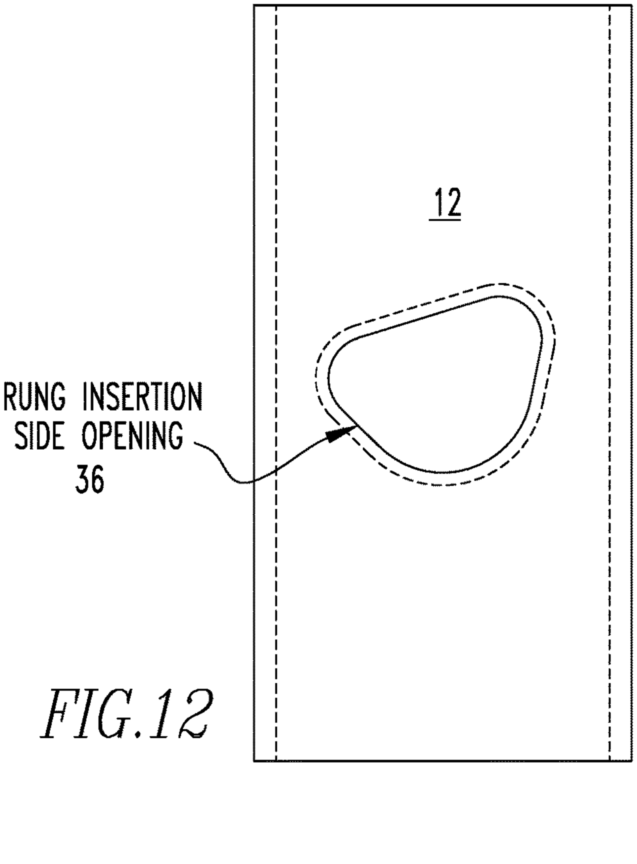
FIG. 12 shows a rung insertion side of a rail.
Figure 13:
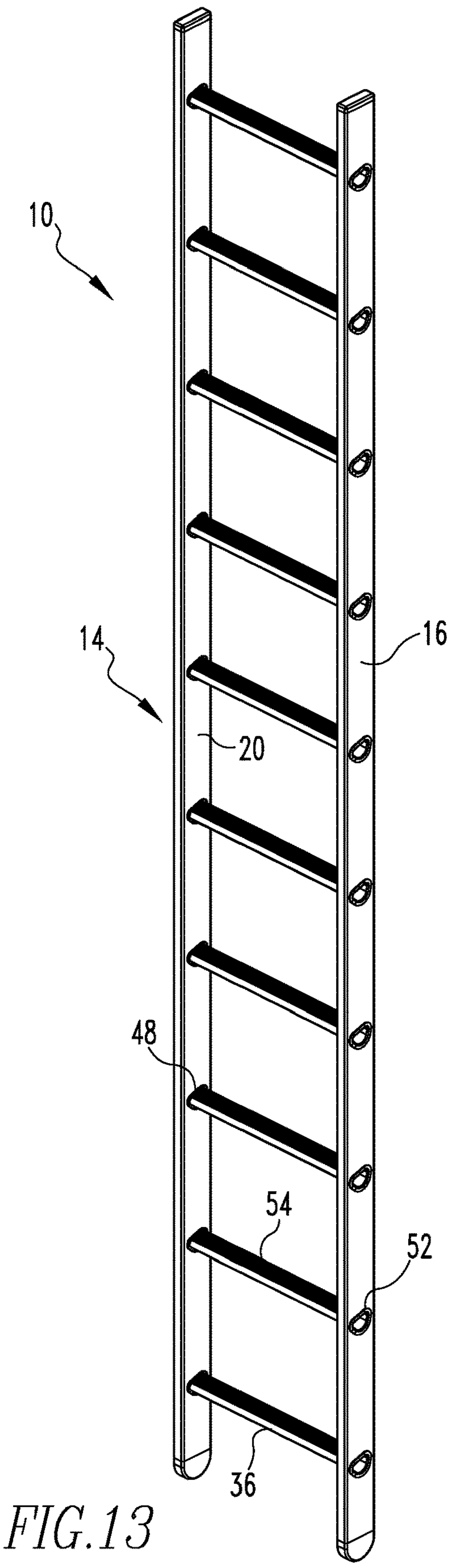
FIG. 13 shows a ladder of the present invention.
Figure 17:
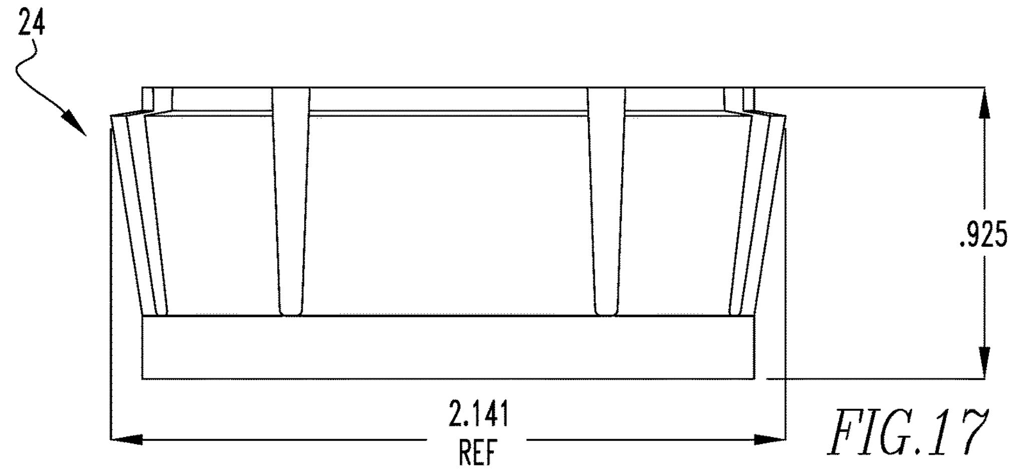
FIG. 17 is a side view of a collar.
Figure 14:
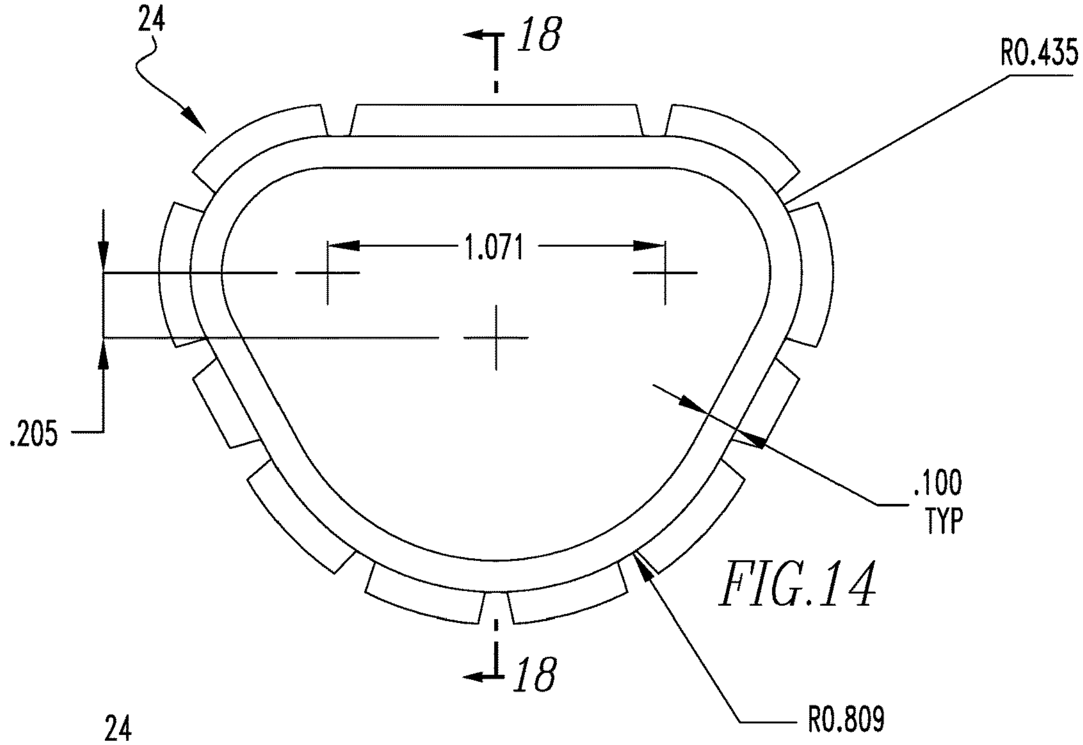
FIG. 14 shows a front view of a collar.
Figure 15:
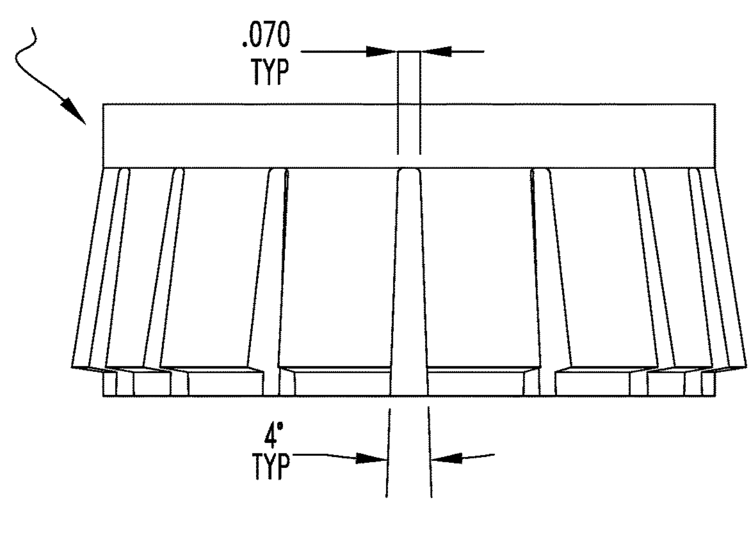
FIG. 15 is a side view of a collar.
Figure 16:
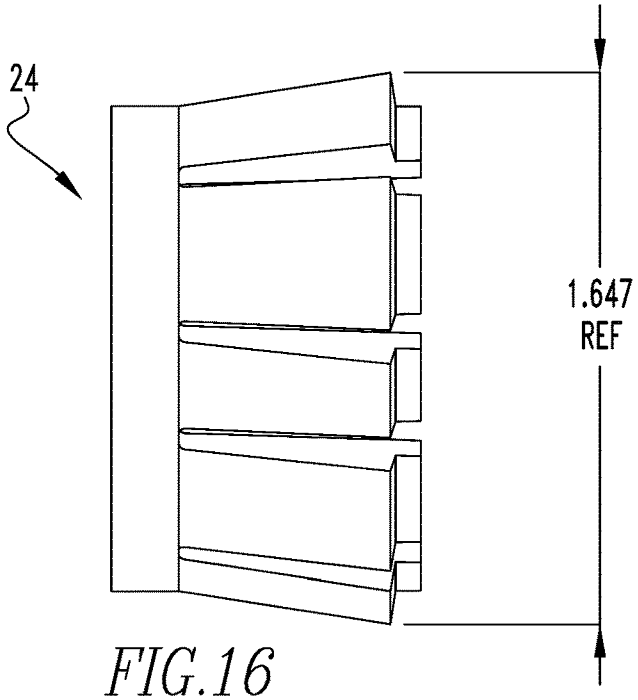
FIG. 16 is a side view of a collar.
Figure 18:
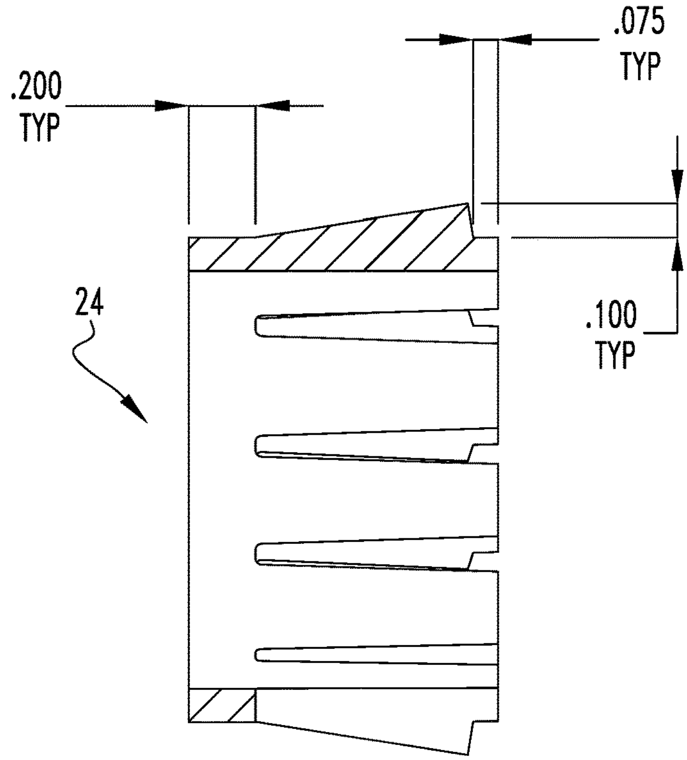
FIG. 18 is a cross-sectional view of a collar.

Referring now to the drawings wherein like reference numerals refer to similar or identical parts throughout the several views, and more specifically to FIGS. 1 and 13 thereof, there is shown a ladder 10. The ladder 10 comprises a right box rail 12 having an outer web 16 with an outer opening 18 and an inner web 20 with an inner opening 22. The inner opening 22 in alignment with the outer opening 18. The inner opening 22 having a diameter which is smaller than a diameter of the outer opening 18. See FIGS. 10 and 12. The ladder 10 comprises a left box rail 14 in parallel and spaced relation with the right box rail 12. The ladder 10 comprises a hollow collar 24 disposed in between the inner opening 22 of the inner web 20 and the outer opening 18 of the outer web 16. The collar 24 having a stem 26 having a plurality of segments 28. The segments 28 separated by slots 30. Each segment 28 having a top 32 and a bottom 34. The ladder 10 comprises a first rung 36 attached to the right and left box rails 12, 14. The first rung 36 having a right end 50 that extends through the outer opening 18, the collar 24 and the inner opening 22.

The collar 24 may have a hollow base 38 with a cross-sectional shape which conforms with a cross-sectional shape of the first rung 36. The first rung 36 extending through the base 38 and the stem 26. The bottom 34 of the segments 28 directly attached to the base 38. The tops of the segments 28 defining an outer stem circumference 40 which is larger than an outer circumference of the base 38. See FIGS. 6-9. The outer stem circumference 40 has a cross-sectional shape which conforms with the cross-sectional shape of the first rung 36. The outer circumference of the base 38 is larger than an outer circumference of the inner opening 22 in the inner web 20.

The top 32 of each segment 28 may have a ridge 42. The ridge 42 having a lower portion 44 which fits in the outer opening 18 in the outer web 16 and directly contacts a surface of the outer opening 18. The ridge 42 having an upper portion 46 which directly contacts an inner surface of the outer web 16. The upper and lower portions 46, 44 of the ridge 42 form a catch 47 with the outer web 16. The ridges 42 of the segments 28 together assist in holding the collar 24 in place in the rail.

An outer surface of the plurality of segments 28 may angle upwards from the bottom 34 to the top 32. The outer surface acting as a cam when the collar 24 is inserted through the outer opening 18 in the outer web 16 where the surface of the outer opening 18 causes the plurality of segments 28 to move down as the plurality of segments 28 moves through the outer opening 18.

The collar 24 may be made of plastic. The collar 24 may be a single piece. The ladder 10 may include a bead 48 disposed on and positioned about the rung adjacent the right end 50 and in contact with the inner web 20 of the right box rail 12. An edge 52 of the right end 50 of the first rung 36 may roll over against the outer web 16 about the outer opening 18. The rung may have a profile of a D shape. The ladder 10 may include a second rung 54 attached to the first and second box rail. The first rung 36 may be hollow. The first rung 36 and the first and second box rails may be made of metal.

In the operation of the invention, a collar 24 is disposed between the webs of a box rail. The collar 24 supports the webs when a connection is made between a beaded and swaged rung and the rail. The collar 24 is easily inserted in the rail by snapping into place from one side of the rail. The collar 24 provides a means of securely joining rungs to box rails without the danger of deforming or cracking the thin webs of a typical box rail. The use of a snap in collar 24 is simpler, less expensive, and faster than alternate techniques such as inserting collars down the length of a box rail and using adhesive.

Figure 2:
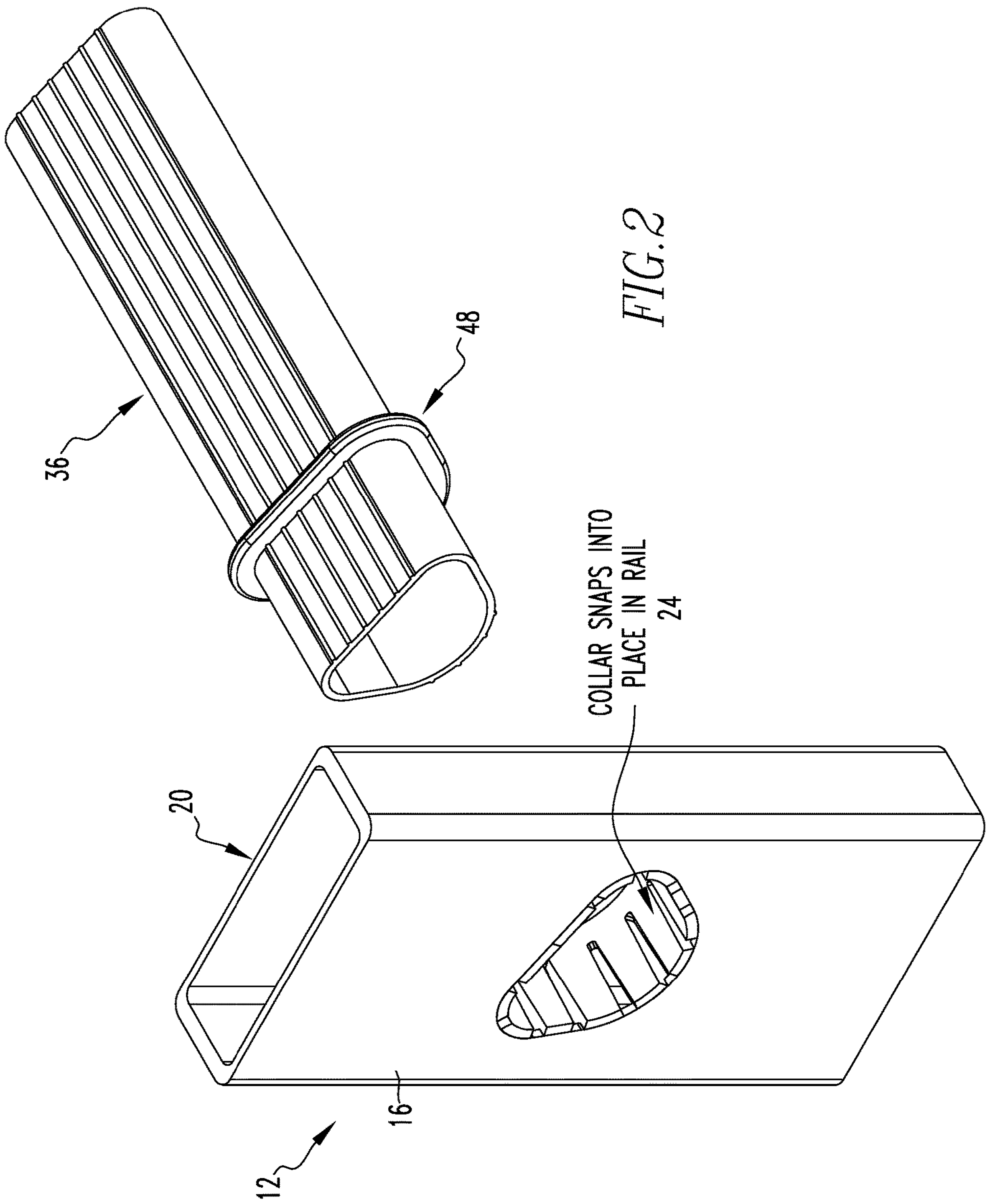
FIG. 2 shows a rung and a rail with the collar in place in the rail.
Figure 3:
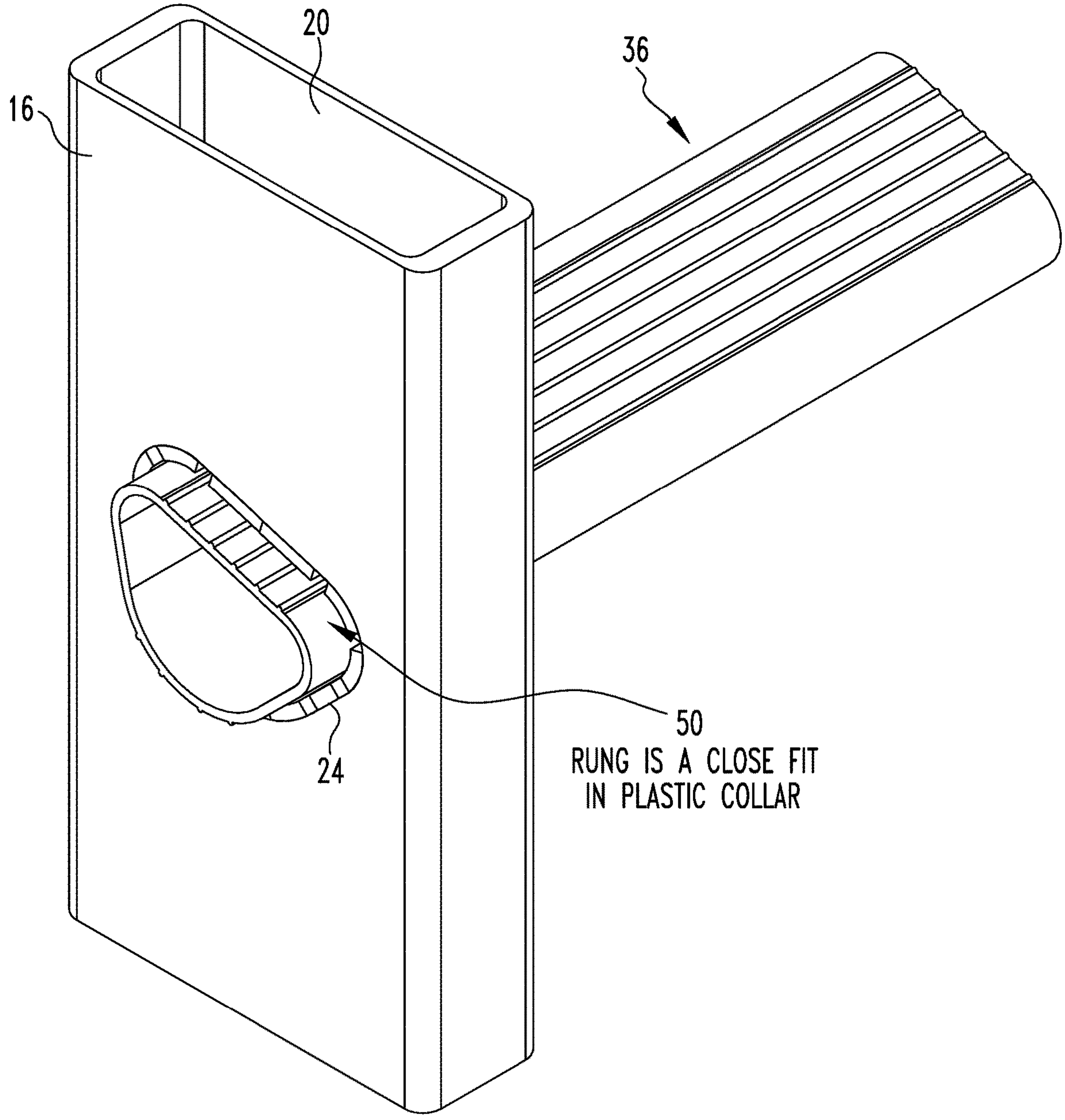
FIG. 3 shows a rung inserted through a rail and a collar, where the collar is disposed in the rail.
Figure 4:
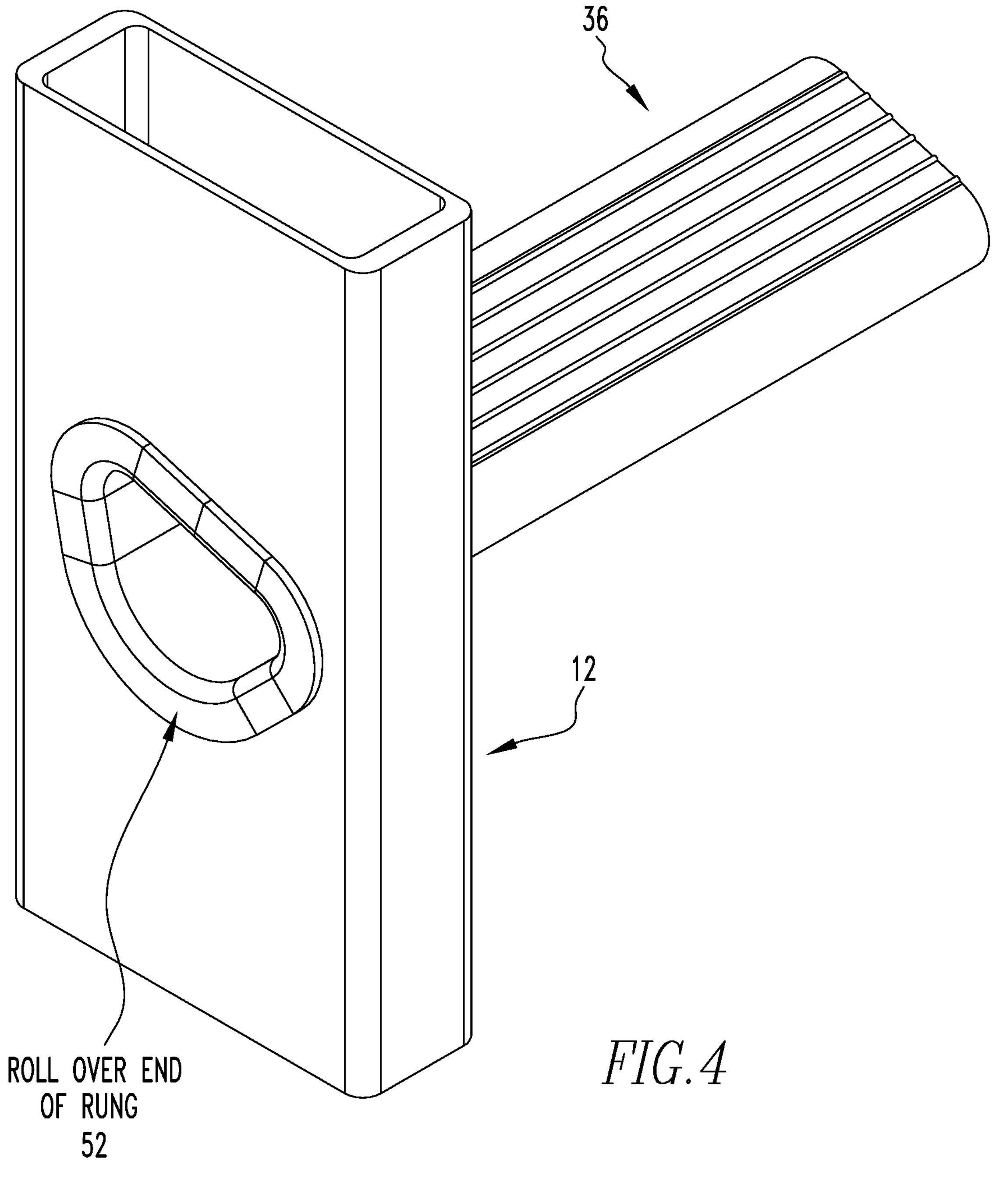
FIG. 4 shows a rung swaged to a rail.

FIGS. 1-4 show the sequential formation of the first rung 36 as it is attached to the right box rail 12. FIG. 1 shows the first rung 36, the right box rail 12 and the collar 24 all as separate and apart from each other. FIG. 2 shows the collar 24 snapped into place in the right box rail 12 with the first rung 36 still separate and apart from the right box rail 12. FIG. 3 shows the right end 50 of the first rung 36 inserted through the collar 24 that is disposed in the right box rail 12. The bead 48 near the right end 50 of the first rung 36 acts as a stop to the first rung 36, limiting any further movement of the first rung 36 through the collar 24. The right end 50 of the first rung 36 extends beyond the outer web 16 of the right box rail 12. FIG. 4 shows the attachment of the first rung 36 with the right box rail 12 completed. The right end 50 of the first rung 36 that extends beyond the outer web 16 of the right box rail 12 has been swaged onto the outer web 16 of the right box rail resulting in the right end 50 having its edge 52 rollover and grip the outer web 16 of the right box rail 12.

Figure 5:
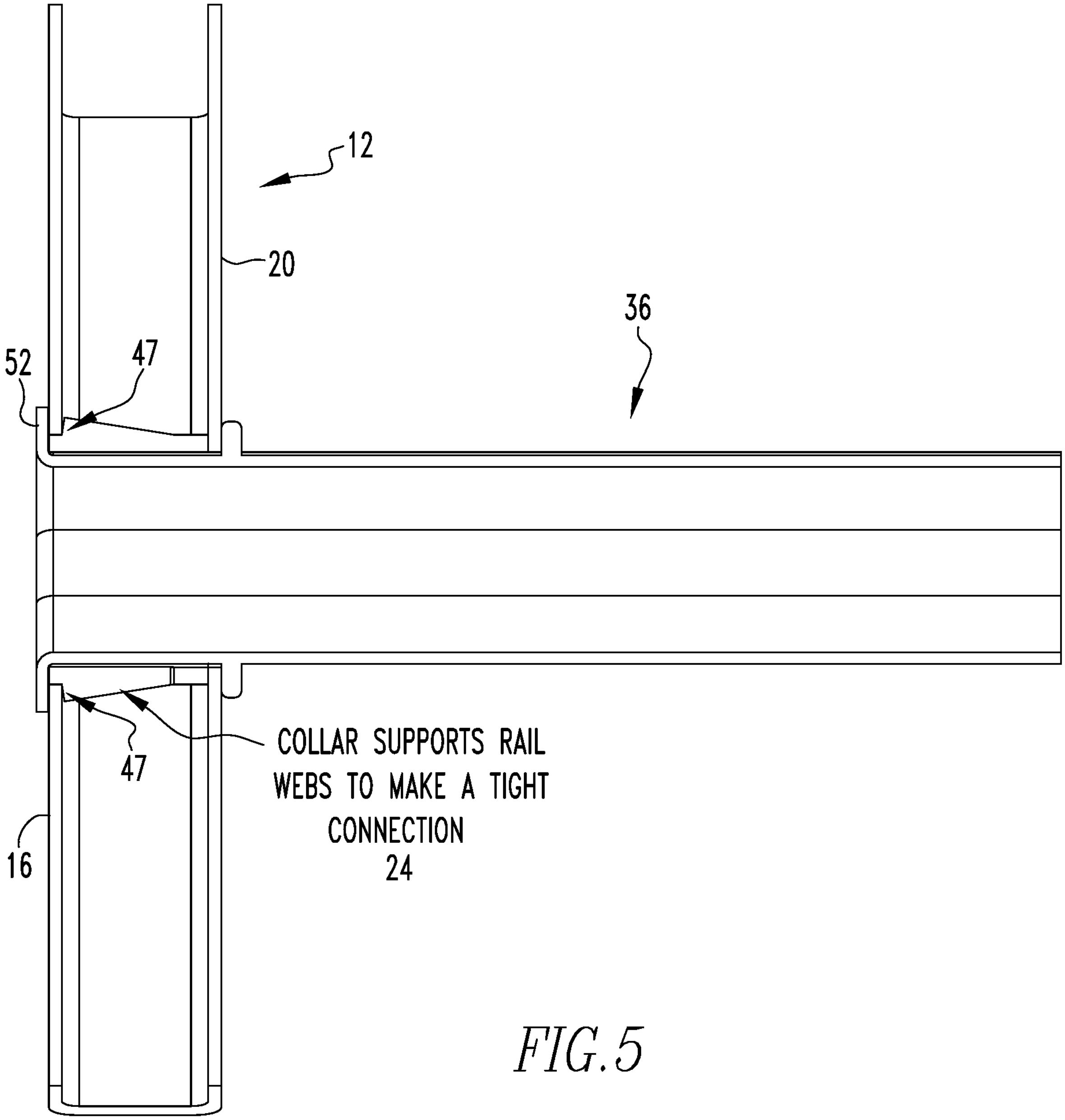
FIG. 5 is a cross-sectional view of a rung swaged to a rail extending through a collar in the rail.
Figure 6:
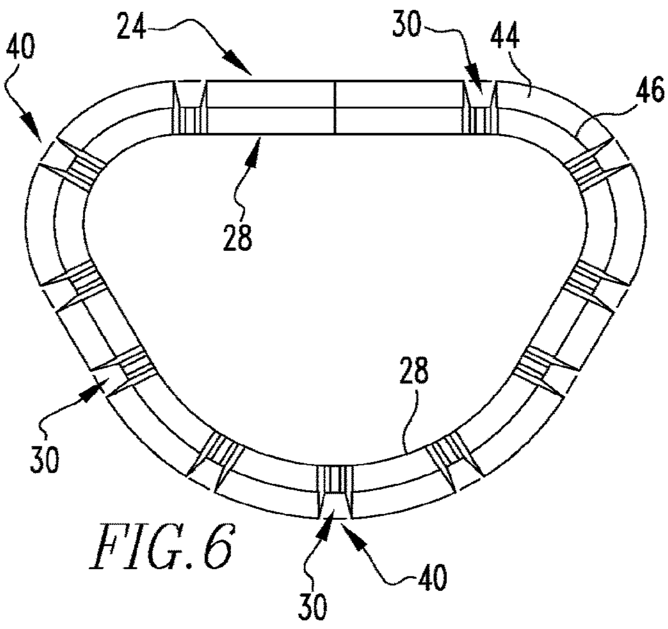
FIG. 6 is a top view of a collar.
Figure 7:
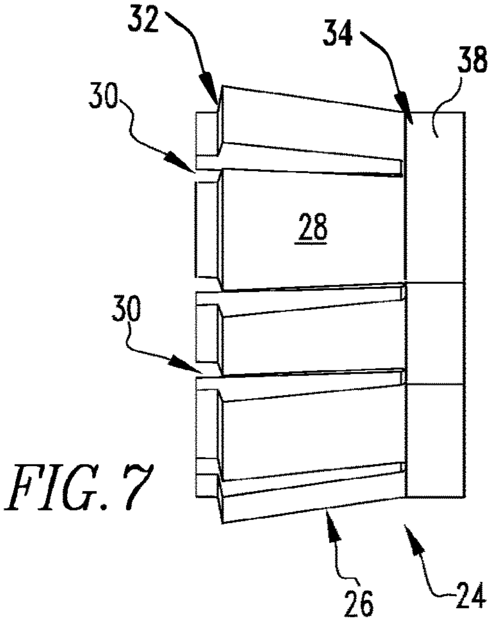
FIG. 7 is a side view of a collar.
Figure 8:
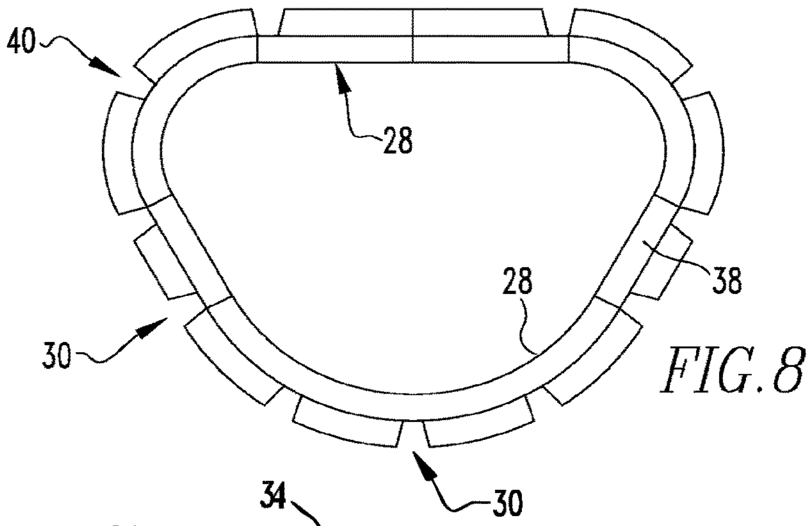
FIG. 8 is a bottom view of a collar.
Figure 9:
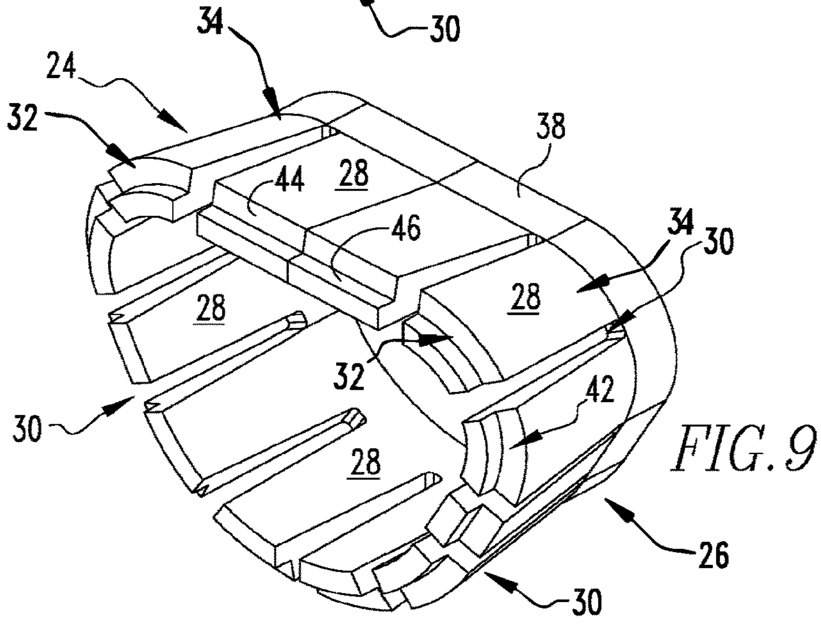
FIG. 9 is a perspective view of a collar.

With reference to FIG. 5, the base 38 of the collar 24 has an outer circumference which is larger than the outer circumference of the inner web opening 22, so when the collar 24 is inserted through the outer web opening 18, the base is stopped by the inner web 20 because the base 38 of the collar 24 cannot fit through the smaller circumference inner web opening 22. The base 38 is disposed against the inner surface of the inner web 20 around the inner web opening 22. Furthermore, as the base 38 is inserted into the outer web opening 18 and moved towards the inner web 20, the segments 28 of the stem 26 are forced inwards by the surface of the outer web opening 18 because the segments 28 have an outer surface circumference which is larger than the outer surface circumference of the outer web opening 18. Slots 30 between the segments 28 allow the segments 28 to be moved inward by the surface of the outer web opening 18 as the collar 24 is moved into the right box rail 12. The insertion of the collar 24 continues until the ridge 42 at the top 32 of the stem 26 formed by the segments 28 reaches the outer web 16 and fits into and contacts the surface of the outer web opening 18 where the ridge 42 forms a catch 47 with the surface of the outer web opening 18. The lower portion 44 of the ridge 42 has an outer circumference which is slightly larger than the circumference of the outer web opening 18 while the upper portion 46 of the ridge 42 extends perpendicularly upwards from the lower portion 44 to contact the inner surface of the outer web 16 about the outer web opening 18. By the lower portion 44 contacting the surface of the outer web opening 18 and the upper portion 46 contacting the inner surface of the outer web 16 about the outer web opening 18, and with the base 38 in contact with the inner surface of the inner web 20, the collar 24 is effectively secured in place in the right box rail 12. When the upper portion 46 of the ridge 42 clears the surface of the outer web opening 18, the segments 28 pop up until the lower portion 44 catches with the surface of the outer web opening 18. The segments 28 have an outer circumference which linearly angles outwards from the bottom 34 to the top 32 of the segments, so the outer surface of the segments acts as a cam surface against the surface of the outer web opening 18 as the collar is inserted into the right box rail 12. The lower portion 44 at the top 32 of the segments 28 does not extend past the outer surface of the outer web 16 so when the edge 52 of the right end 50 is swaged to the outer surface of the outer web 16, the rollover that is formed makes contact with the outer surface of the outer web 16 and is flush with the outer surface of the outer web 16. The distance of the collar 24 from the base 38 to the top 32 of the stem is about the same distance of the right box rail 12 it is being inserted in from the inner surface of the inner web 20 to the outer surface of the outer web 16 of the right box rail 12.

When the swaging process occurs, the inner web 20 an outer web 16 will not buckle inwards or crack or be damaged because the collar 24 is present to receive the compressive loads that are applied in the swaging process and effectively hold the outer web 16 an inner web 20 in place and apart. That is, the segments and base of the collar 24 act as support walls supporting the inner and outer webs against the compressive loads.

A collar 24 is snapped into all the openings of the right and left rails, in the process described above is then repeated for the end of each rung to attach each rung to the right and left rails of the ladder 10.

FIGS. 14-18 show dimensions regarding a preferred embodiment of the collar 24, where the collar 24 is made of 10% glass filled polypropylene. The rungs him attached to the rails through the collars 24 as described herein support at least 350 pounds of load and in excess of 500 pounds load without failure or cracking. Specifically, the ladder 10 supports 34 pounds of cyclic loading, 1000 pounds of rung to rail stress, where 1000 pounds of load is applied to a rung within 3.5 inches of the rail, in 1000 pounds of rung vending, where the 1000 pounds of vertically downward loads is applied within 3.5 inches of the center of a rung between the first and second rails to which the rung is attached. All of these aforementioned tests follow and meet the criteria for such tests designated by the ANSI code of 2019.

Alternatively, instead of the outer web opening 18 having a larger circumference than the inner web opening 22, this can be reversed so the outer web opening 18 has a smaller circumference than the inner web opening 22. In this alternative embodiment, the collar 24 is then inserted through the inner web opening 22, with everything occurring as described above.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:

a first box rail having an outer web with an outer opening and an inner web with an inner opening, the inner opening in alignment with the outer opening, the inner opening having a circumference which is smaller than a circumference of the outer opening;

a second box rail in parallel and spaced relation with the first box rail;

a hollow collar disposed in between the inner opening of the inner web and the outer opening of the outer web, the collar having a stem having a plurality of segments, the segments separated by slots, each segment having a top and a bottom; and a first rung attached to the first box rail and the second box rail, the first rung having a first end that extends through the outer opening, the collar and the inner opening, the collar has a hollow base with a cross-sectional shape which conforms with a cross-sectional shape of the first rung, the first rung extending through the base and the stem: wherein the bottom of the segments are directly attached to the base and wherein the tops of the segments define an outer stem circumference which is larger than an outer circumference of the base, an inner stem circumference has a cross-sectional shape which conforms with the cross-sectional shape of the first rung in an installed configuration, the outer circumference of the base is larger than the outer circumference of the inner opening in the inner web.

2. The ladder of claim 1 wherein the top of each segment has a ridge, the ridge having a lower portion which fits in the outer opening in the outer web and directly contacts a surface of the outer opening, the ridge having an upper portion which directly contacts an inner surface of the outer web, the upper and lower portions of the ridge form a catch with the outer web, the ridges of the segments together assist in holding the collar in place in the first box rail.

3. The ladder of claim 1 wherein an outer surface of a plurality of segments angles upwards from the bottom to the top, the outer surface acting as a cam when the collar is inserted through the outer opening in the outer web where the surface of the outer opening causes the plurality of segments to move down as the plurality of segments moves through the outer opening.

4. The ladder of claim 1 wherein the collar is made of plastic.

5. The ladder of claim 1 wherein the collar is a single piece.

6. The ladder of claim 1 including a bead disposed on and positioned about the first rung adjacent the first end and in contact with the inner web of the first box rail.

7. The ladder of claim 1 wherein an edge of the first end of the first rung rolls over against the outer web about the outer opening.

8. The ladder of claim 1 wherein the first rung has a profile of a D shape.

9. The ladder of claim 1 including a second rung attached to the first box rail and the second box rail.

10. The ladder of claim 1 wherein the first rung is hollow.

11. The ladder of claim 1 wherein the first rung, the first box rail, and the second box rail are made of metal.

* * * * *